United States Patent [19]

Wakabayashi

[11] Patent Number: 5,041,716

[45] Date of Patent: Aug. 20, 1991

[54] LASER MACHINING DEVICE COMPRISING AN ACOUSTO-OPTIC MODULATOR UNIT

[75] Inventor: Koji Wakabayashi, Tokyo, Japan

[73] Assignee: NEC Corporation, Tokyo, Japan

[21] Appl. No.: 590,837

[22] Filed: Oct. 1, 1990

[30] Foreign Application Priority Data

Sep. 29, 1989 [JP] Japan ................................. 1-254126

[51] Int. Cl.⁵ .............................................. B23K 26/00
[52] U.S. Cl. ........................... 219/121.68; 219/121.62; 219/121.82; 219/121.83
[58] Field of Search ............... 364/474.08; 219/121.61, 219/121.62, 121.68, 121.69, 121.82, 121.83, 121.8

[56] References Cited

U.S. PATENT DOCUMENTS

| | | | |
|---|---|---|---|
| 4,865,683 | 9/1989 | Burns | 156/627 |
| 4,920,430 | 4/1990 | Isono et al. | 358/481 |
| 4,970,600 | 11/1990 | Garnier et al. | 358/299 |

Primary Examiner—C. L. Albritton
Attorney, Agent, or Firm—Sughrue, Mion, Zinn, Macpeak & Seas

[57] ABSTRACT

In order to surface treat an object by a laser beam emitted along an optical path and focussed on the object, a laser machining device comprises a converter for converting clock pulses representative of relative movement between the optical path and the object into first and second clock sequences of a first clock period and a second clock period which is an integral multiple of the first clock period. Controlled by the first clock sequence, a register produces a first data signal representative of beam on and off dots. Controlled by the second clock sequence, another register produces a second data signal representative of beam on and off units. A combined signal of the first and the second data signals represents the beam on and off dots in each beam on unit and controls an acousto-optic modulator unit to direct the laser beam to the object when the combined signal represents the beam on dots. Along a line of scan of the laser beam relative to the object, each beam on or off unit is composed of the beam on and off and the beam off dots, equal in number to the integral multiple. Preferably, a Q switch is controlled by the first clock sequence to direct the laser beam to the acousto-optic modulator unit when the first data signal represents the beam on and off dots in the beam on and off units.

4 Claims, 4 Drawing Sheets

LASER MACHINING DEVICE COMPRISING AN ACOUSTO-OPTIC MODULATOR UNIT

BACKGROUND OF THE INVENTION

This invention relates to a laser machining device for surface treating an object or workpiece by a laser beam, Laser machining devices are used in various fields. In a laser machining device in general, a laser beam is emitted along an optical or beam path and focussed on the object as a beam dot. In one of the fields, indents are formed into the object at such beam dots in a predetermined pattern. The object is typically a sheet of steel. The surface treatment is called dull processing in the art.

In order to generate the laser beam, a laser beam source is placed perliminarily in the laser machining device on actually surface treating object. The laser beam source may comprise a laser diode.

In the manner which will later be described with reference to one of several drawing figures of the accompanying drawing, a conventional laser machining device comprises a table or worktable which is movable relative to the optical path and is for carrying the object. A control unit is used to control movement of the table relative to the optical path and operation of a mechanical beam shutter or switch which is placed transversely of the optical path to carry out on-off control of the laser beam. The predetermined pattern is decided by relative movement between the table and the optical path and by timing of the on-off control of the laser beam. It is to be noted in connection with the conventional laser machining device that the laser beam can not be on-off controlled at a high on-off rate or speed.

In the meanwhile, an excellent Q switch is disclosed in U.S. Pat. No. 3,434,073 issued to John F. Forkner. The Q switch can be used in place of the mechanical beam shutter to on-off control the laser beam. It is, however, impossible to stably surface treat the object with the Q switch. This is because the laser beam source is subjected to different conditions of operation when the Q switch is used to on-off control the laser beam at different on-off rates. The Q switch is an example of acousto-optic modulators.

SUMMARY OF THE INVENTION

It is therefore an object of the present invention to provide a laser machining device, in which a laser beam can be on-off controlled at an on-off rate which is more than twice as high as a conventional on-off rate.

It is another object of this invention to provide a laser machining device of the type described, which is capable of forming a plurality of indents into the object with an excellent appearance.

Other objects of this invention will become clear as the description proceeds.

On describing the gist of this invention, it is possible to understand that a laser machining device is for machining an object by a laser beam emitted along an optical path and focussed on the object and comprises a table which is movable relative to the optical path and is for carrying the object. A movement analyzer is for analyzing relative movement between the table and the optical path to produce clock pulses representative of the relative movement.

According to this invention, the above-understood laser machining device comprises: (1) converting means for converting the clock pulses to first and second clock sequences of a first and a second clock period, where the second clock period is an integral multiple of the first clock period; (2) a first register controlled by the first clock sequences for producing a first data signal representative of beam on and off dots; (3) a second register controlled by the second clock period for producing a second data signal representative of beam on an off units; (4) a logic circuit supplied with the first and the second data signals for producing a combined signal representative of the beam on dots only in each beam on unit; and (5) an acousto-optic modulator unit placed along the optical path and supplied with the combined signal for directing the laser beam to the object when the combined beam represents the beam on dots.

DESCRIPTION OF THE PREFERRED EMBODIMENT

Figure 1:
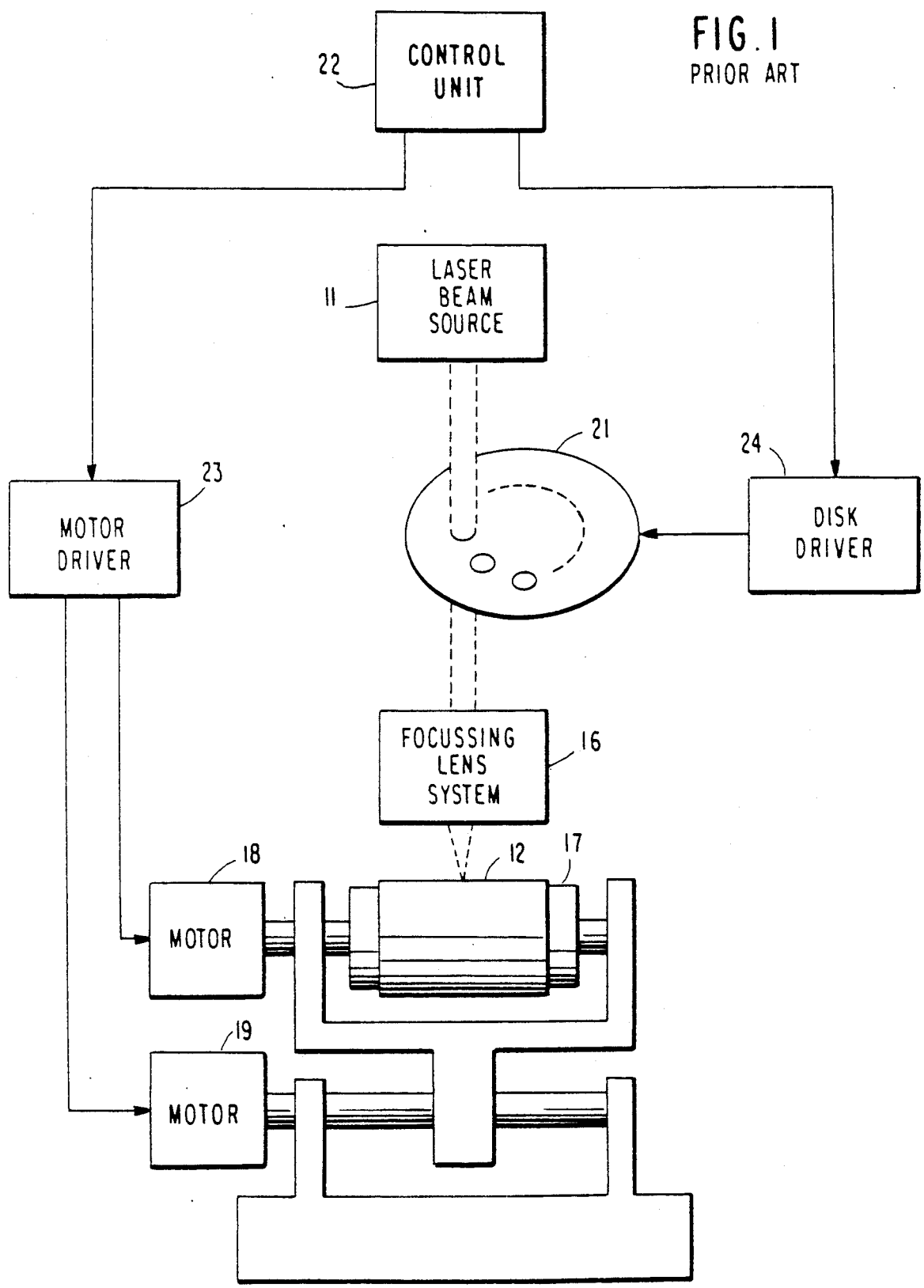
FIG. 1 is a schematic side view of a conventional laser machining device.

Referring to FIG. 1, a conventional laser machining device will be described at first in order to facilitate an understanding of the present invention. A laser beam source 11 is placed in the laser machining device to emit a laser beam along an optical or beam path. The laser beam is depicted by dashed lines. The laser machining device is for carrying out surface treatment of an object or workpiece 12 by the laser beam and comprises a focussing lens system 16 for focussing the laser beam on the object 12 as a beam dot of spot.

A work roll 17 is used as a table which is movable relative to the optical path and is for carrying the object 12. It should be understood that the optical path is represented centrally of the laser beam. In the example being illustrated, the optical path does not move. Instead, the work roll 17 is rotated by a rotating servomotor 18 and is linearly fed by a feeding servomotor 19.

A mechanical beam shutter or switch 21 is placed perpendicularly of the optical path. In the illustrated example, the beam shutter 21 is a disk rotatable on a disk axis which is parallel to the optical path. A plurality of perforations are formed through the disk azimuthally equidistant along a circle which has its center on the disk axis.

A control unit 22 is for controlling a motor drive and a disk driver 24. Controlled by the control unit 22, the motor driver 23 makes the rotating and the feeding servomotors 18 and 19 drive table 17 and thereby the object 12. Related to control of movement of the object 12, the control unit 22 controls the disk driver 24 to rotate the beam shutter 21 and thereby to carry out on-off control of the laser beam. As a consequence, the laser beam is focussed on the object 12 as beam dots or spots in a predetermined pattern. Indents are formed into the object 12 at the respective beam dots.

It is to be noted in connection with the conventional laser machining device that the laser beam can not be on-off controlled at a high on-off rate or speed. This is because it is very difficult to controllably rotate the beam shutter 21 at a high speed of rotation.

An excellent Q switch is revealed in Forkner patent cited heretobefore. It is possible to substitute the Q switch for the mechanical beam shutter 21. The laser beam can thereby be on-off controlled at an on-off rate between 10 and 20 kHz. The Q switch, however, adversely affects operation of the laser beam source 11 when a change takes place in the on-off rate. More particularly, the laser beam source 11 generates the laser beam with different peak output power under different conditions of operation. Consequently, the indents are formed into the object 12 with differnt depths. This makes it impossible to stably and uniformly surface treat the object 12.

Figure 2:
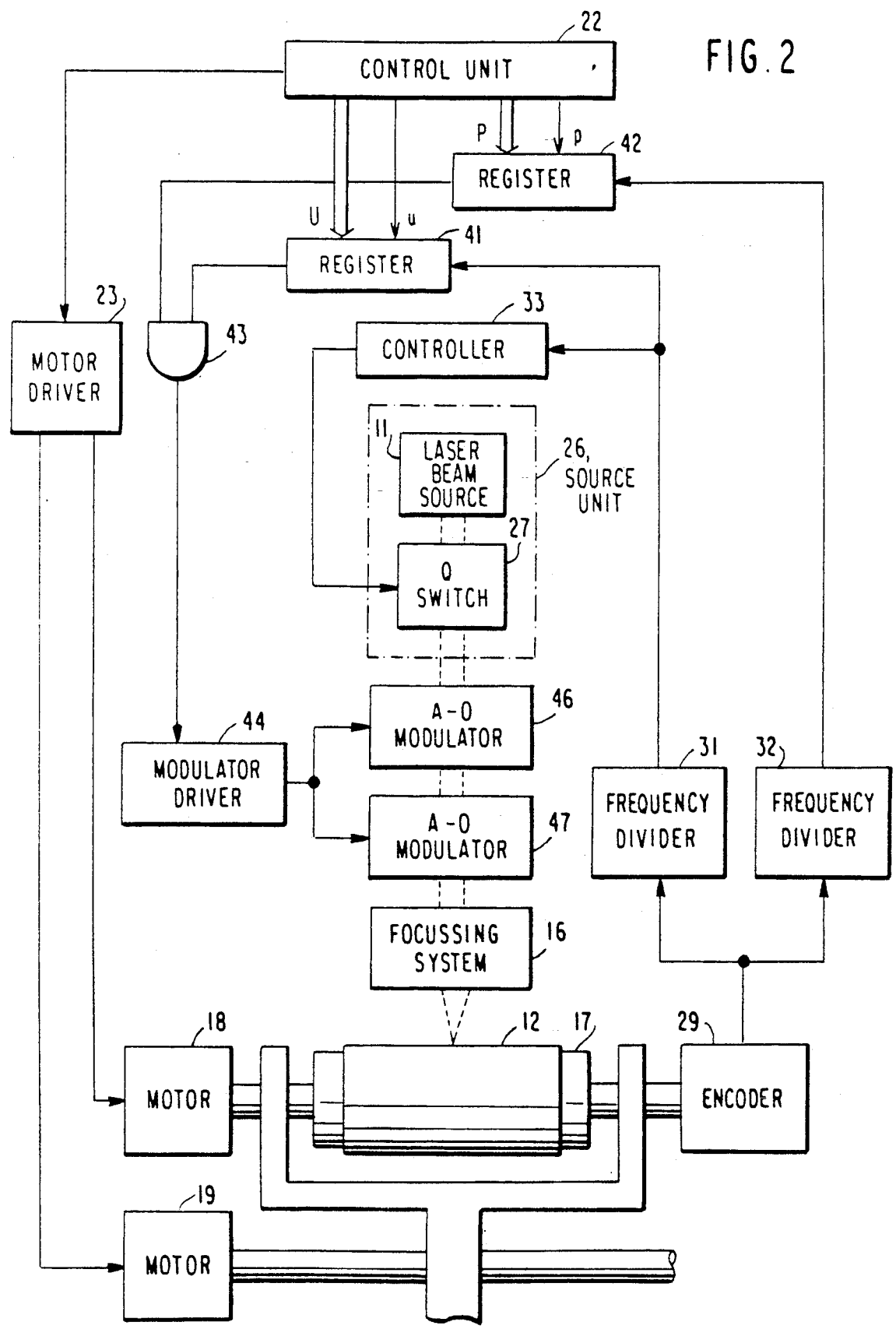
FIG. 2 schematically shows a partial side view of a laser machining device according to an embodiment of the instant invention together with a laser beam source placed in the laser machining device being illustrated.

Referring to FIG. 2, the description will proceed to a laser machining device according to a preferred embodiment of this invention. Similar parts are designated by like reference numerals and are likewise operable.

The laser machining device comprises a beam source unit 26 comprising a Q switch 27. The laser beam source 11 is placed in the beam source unit 26 before using the laser machining device in surface treatment of the object 12. Typically, the object 12 is a sheet of steel.

It should be understood that the laser beam source 11 should be placed relative to the Q switch 27 in the manner described in the above-referenced Forkner patent. It is readily possible so to place the laser beam source 11 by preliminarily selecting a predetermined positional relationship of the laser beam source 11 to the Q switch 27.

It may be mentioned here that the surface treatment is forming indents into the object 12 in a predetermined pattern. For this purpose, the laser beam is focussed by the focussing lens system 16 on the object 12 as a beam dot or spot of about 30 microns in diameter. The motor driver 23 is controlled by the control unit 22 to make the feeding servomotor 19 linearly feed the work rool 17 about 30 microns after completion of each 360° rotation by the rotating servomotor 18. While the object 12 is so moved relative to the optical or beam path, the laser beam is subjected to on-off control in the manner which will become clear as the description proceeds. The beam dot therefore moves relative to the object 12. The indents are formed into the object 12 at the respective beam dots.

Figure 3:
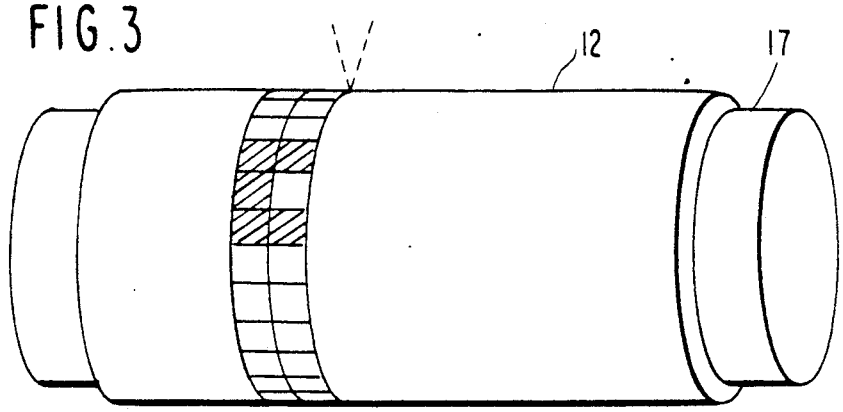
FIG. 3 is a schematic perspective view of a work roll for use as a table in the laser machining device illustrated in FIG. 2 and an object carried by the table.
Figure 4:
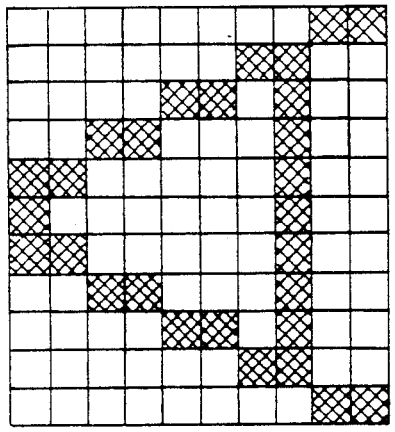
FIG. 4 shows as a developed representation of beam on an off units or areas, a pattern which should be formed on the object depicted in FIG. 3.

Turning to FIGS. 3 and 4 during a short while, the predetermined pattern comprises a capital A which may be a few millimeters high and wide and is divided into a plurality of units or areas. In the example being illustrated, the units are arranged as a higher-order matrix in first through tenth rows and first through eleventh columns. The beam dots are formed only in cross-hatched units which are referred to herein as beam on units. No indents are formed in other blank units which are herein called beam off units.

Figure 5:
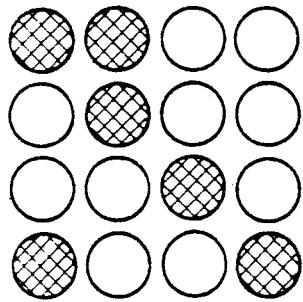
FIG. 5 shows, on an enlarged scale and as a unit of beam on and off dots, a beam on unit depicted in FIG. 4.

Further turning to FIG. 5, each of the beam on units comprises a plurality of dots or circles. Merely for simplicity of illustration, each beam on unit is represented by a lower-order matrix in first through fourth rows and first through fourth columns of the dots or circles. The laser beam is incident on the object 12 as the beam dot or spot only at each of cross-hatched dots which are herein referred to as beam on dots. Even in the beam on unit, the laser beam is shut off at each of other blank dots which are called beam off dots. It should be noted that the illustrated beam on unit has no specific relation to the beam on units illustrated in FIG. 4. Each beam off unit comprises four by four beam off dots.

In FIGS. 4 and 5, the laser beam moves relative to the object 12 during one complete rotation of the work roll 17 along each row of the lower-order matrix. The laser beam therefore scans the units in the first rows of the higher-order matrix in first through fourth scans. The laser beam scans the second row of the higher-order matrix in fifth through eight scans. It is now understood that the object 12 is depicted in FIG. 3 after completion of the eight scan.

In this manner, relative movement between the work roll or table 17 and the optical path causes the laser beam to scan the object along a line of scan. Each beam on unit is composed of a first plurality of beam on and-/or off dots parallel to and perpendicularly of the line of scan. Each beam off unit consists of the first plurality of beam off dots parallel and perpendicular to the line of scan. The predetermined pattern may consist of predetermined pattern elements. Each pattern element is divided into a second plurality of beam on and/or off units along the line of scan, where the second plurality may vary from the pattern element under consideration to another.

Turning back to FIG. 2, an encoder 29 is mechanically coupled to the work roll 17 to detect rotation and linear feed of the work roll 17. Analyzing movement of the work roll 17 in this manner, the encoder 29 produces clock pulses. It is preferred that the clock pulses are produced at every one second of angle as a sequence in each complete rotation of the work roll 17. Consequently, 129,600 clock pulses are produced in each sequence. Successive sequences of clock pulses are produced at every 0.2-micron feed of the work roll 17.

A first frequency divider 31 is for frequency dividing the clock pulses of the successive sequences into a first clock sequence of a first clock period. Typically, the first clock sequence comprises one first-period clock pulse when eighty clock pulses are supplied from the encoder 29. A second frequency divider 32 is for frequency dividing either the first clock sequence or the clock pulses supplied from the encoder 29 to produce a second clock sequence of a second clock period which is equal to an integral multiple of the first clock period. In the manner which will later become clear, the first clock period is for defining each dot or circle in each beam on or off unit. The second clock period is for defining each beam on or off unit in the predetermined pattern. The integral multiple is therefore equal to four in the example being illustrated.

A switch controller 33 is supplied with the first clock sequence from the first frequency divider 31 to produce a switch control signal. Controlled by the switch control signal, the Q switch 27 controls in synchromism with the first clock period the laser beam emitted by the laser beam source 11. The laser beam passes through the Q switch 27 at the respective dots or circles depicted in FIG. 5, namely, at the beam on and off dots in the beam on and off units. When the Q switch 27 shuts off the laser beam, the laser beam source 11 is made to accumulate energy of laser oscillation.

When used in the conventional laser machining device in place of the mechanical beam shutter or switch 21 depicted in FIG. 1, the Q switch is on-off controled at different on-off rates. In marked contrast, the Q switch 27 in on-off controlled always at the first clock period. The laser oscillation is therefore disturbed only at a few initial ones of successive first clock periods that have in general no concern with the predetermined pattern formed on the object 12. In other first clock periods, the Q switch 27 does not adversely affect the conditions of operation of the laser beam source 11. The laser beam is therefore generated with an always constant peak output power to uniformly form the indents in the object 12 and thereby to give an excellent appearance to the object 12.

Figure 6:
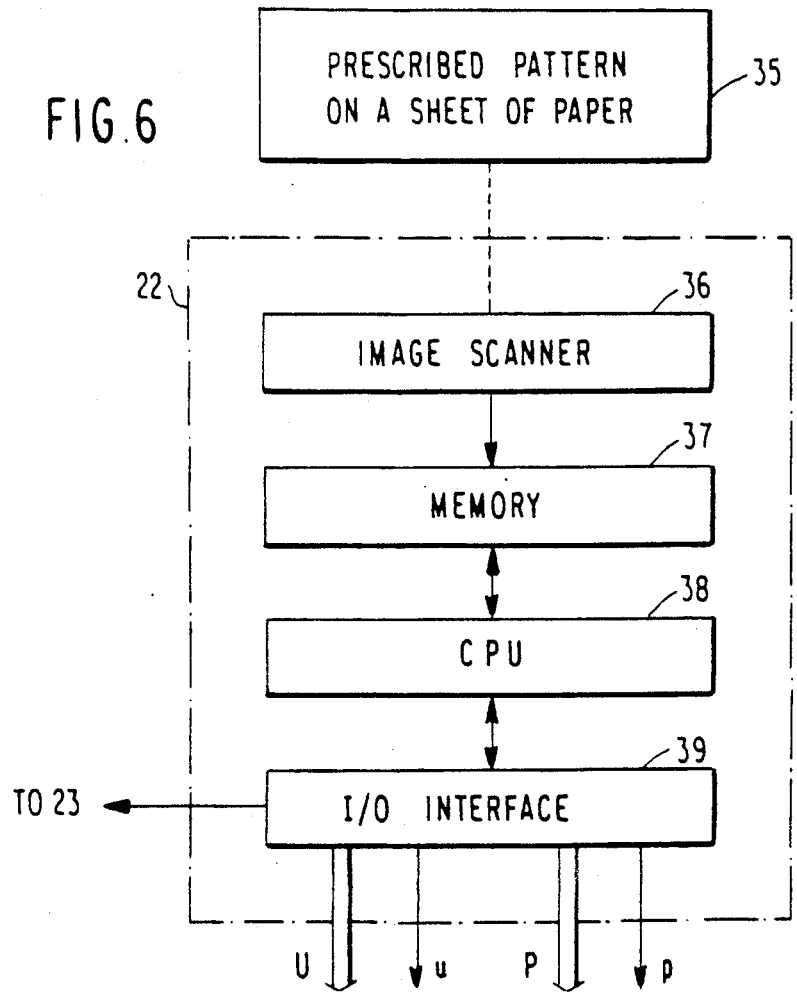
FIG. 6 is a block diagram of a control unit for use in the laser machining device shown in FIG. 2.

Turning temporarily to FIG. 6, the control unit 22 is considerably different from the control unit 22 described in conjunction with FIG. 1 although the both control units are designated by the reference numeral 22. The predetermined pattern is preliminarily described as a prescribed pattern in black on a sheet of paper 35 which gives a white background of the prescribed pattern. It is unneccessary that the prescribed pattern should be identical with the predetermined pattern in size and shape.

In FIG. 6, the control unit 22 comprises an image scanner 36 for reading the prescribed pattern to produce a binary signal representative of picture elements of the prescribed pattern. A memory 37 is connected to the image scanner 36 to memorize the binary signal as a memorized signal. A central processing unit (CPU) 38 is connected to the memory 37 to process the memorized signal into a unit data signal U, a pattern data signal P, and unit and pattern data write signals u and p. These signals are delivered outwardly of the control unit 22 through an input-output (I/O) interface 39.

The unit data signal U represents the beam on and off dots in the beam on units and only the beam off dots in the beam off units. Typically, each beam on dot is represented by a logic one bit and each beam off dot, by a logic zero bit. When each beam on or off unit consists of four by four dots or circles in the manner exemplified in FIG. 5, four bits of the unit data signal U are produced in bit parallel as each unit data signal unit. The pattern data signal P is for discriminating between the beam on and off units by the logic one and zero bits. When each scan consists of a predetermined number m of the second clock periods, m bits of the pattern data signal P may be produced in bit parallel as each pattern data signal unit.

Figure 7:
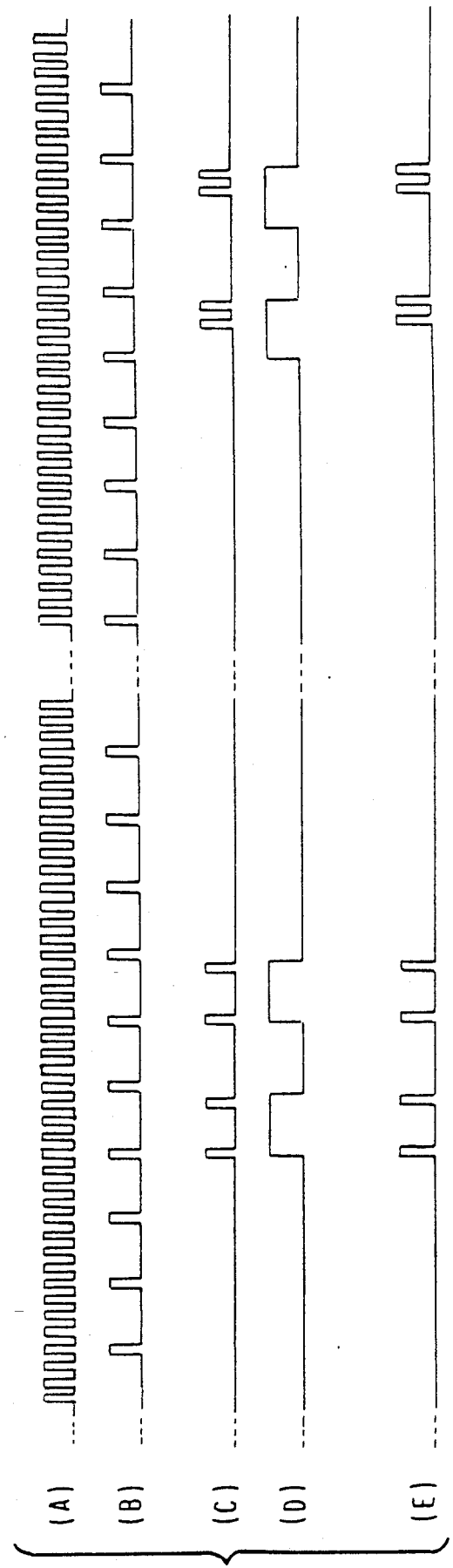
FIG. 7 schematically exemplifies wave forms used in the laser machining device illustrated in FIG. 2.

Turning back again to FIG. 2 and referring afresh to FIG. 7, it will be presumed that the laser beam source 11 is placed in the beam source unit 26 and is kept in operation. On surface treating the object 12, the control unit 22 is manually or otherwise made to deliver a driving command from the input-output interface 39 (FIG. 6) to the motor driver 23. The work roll 17 begins to move the object 12. The encoder 29 starts to produce the clock pulses.

When the object 12 moves to a predetermined position where the first scan of the laser beam should start on the first row and first column dot or circle in a unit or area positioned in the first row and in the first column of the predetermined pattern, the first and the second frequency drivers 31 and 32 are put into operation of producing the first and the second clock sequences in the manner illustrate in FIG. 7 along first or top and second lines labelled and (A) and (B). It is readily possible so to control the first and the second frequency drivers 31 and 32.

The unit data signal U is preliminarily written in a first register 41 by the unit data write signal u and the pattern data signal P, in a second register 42 by the pattern data write signal p. Alternatively, the unit and the pattern data write signals u and p may be produced when the object 12 moves to the predetermined position.

The first clock sequence is delivered, besides the switch controller 33, to the first register 41. The second clock sequence is delivered to the second register 42. Timed by the first clock sequence, the first register 41 produces a first data signal representative of the unit data signal. Likewise, the second register 42 produces a second data signal representative of the pattern data signal.

It will be assumed that the object 12 is subjected to the fifth and the sixth scans by the laser beam and that the beam on unit is depicted in FIG. 5 as each of the beam on units illustrated in FIG. 4 in the second row and in the fifth and the seventh columns. Under the circumstances, the first and the second data signals are produced in the manner shown in FIG. 7 along third and fourth lines labelled (C) and (D).

The first data signal has a logic one level when the laser beam should be focussed at the beam on dots. Otherwise, the first data signal has a logic zero level. The second data signal keeps the logic one level while the laser beam scans each beam on unit. Otherwise, the second data signal keeps the logic zero level. Breifly speaking, the first data signal represents the beam on and off dots and the second data signal, the beam on and off units.

The first and the second data signals are delivered to a logic circuit 43 for producing a combined signal which has the logic one level only when the laser beam should be focussed on the object 12 at the beam on dots. Otherwise, the combined signal has the logic zero level. In short, the combined signal represents the beam on and off dots only in each beam on unit and the beam off dots in each beam off unit in the manner depicted in FIG. 7 along a fifth or bottom line labelled (E).

The combined signal is delivered to a modulator driver 44 simultaneously driving first and second acousto-optic (A-O) modulators 46 and 47 which are serially placed or arranged along the optical path. Controlled by the combined signal through the modulator driver 44, a combination of the acousto-optic modulators 46 and 47 allows the laser beam to pass therethrough towards the object 12 only when the combined signal has the logic one level. Two acoustic-optic modulators 46 and 47 are herein used because the laser beam can not be fully on-off controlled by a single acousto-optic modulator. Use of two acousto-optic modulators is sufficient to excellently on-off control the laser beam.

The combination of first and second acousto-optic modulators 46 and 47 is herein called an acousto-optic modulator unit. Placed along the optical path and supplied with the combined signal, the acousto-optic modulator unit directs the laser beam to the object 12 when the combined signal represents the beam on dots in the beam on units.

Reviewing FIGS. 2 through 7, it is readily understood that a table or worktable can be used to carry a flat object or workpiece. The optical path of the laser beam can be subjected to a raster scan by a beam scanner, such as a galvaonometer, with the table 17 kept still. If desired, the table may have a concave surface in order to facilitate focussing of the laser beam on the object 2.

When the laser beam is subjected to the raster scan, the encoder 29 is coupled to the beam scanner to preferably electrically or otherwise detect scan of the laser beam relative to the table 17. In this manner, the encoder 29 serves as a movement analyzer which is coupled either to the table 17 or to the beam scanner to analyze relative movement between the table 17 and the optical path to produce the clock pulses. A combination of the first and the second frequency dividers 31 and 32 serves as a converting unit connected to the movement analyzer for converting the clock pulses to the first and the second clock sequences.

When placed in the beam source unit 26 in the predetermined positional relationship to the Q switch 27, the laser beam souce 11 may be said to generate a laser oscillation beam along the optical path. Supplied with the first clock sequence, the Q switch 27 allows the laser oscillation beam to pass therethrough as the laser beam in synchronism with representation by the first data signal of the beam on and off dots in the beam on and off units.

Inasmuch as the predetermined pattern is divided into the beam on and off units with each unit composed of either the beam on and off dots or of the beam off dots, it is possible to form indents into the object 12 in a predetermined pattern of a desired size. It is possible to form the indents with the laser beam on-off controlled at as high an on-off rate as 50 kHz. This on-off rate is more than twice as high as the conventional on-off rate.

While this invention has thus far been described in specific conjunction with a single embodiment thereof and a few modifications, it will now be readily possible for one skilled in the art to carry this invention into effect in various other manners. For example, it is possible to select a different number of dots or circles along each row and each column of each beam on or off unit. In this event, each beam on unit is said to be composed of a first plurality of beam on and off dots parallel to a line of scan of the optical path relative to the table 17 and a second plurality of beam on and off dots orthogonally of the line of scan. The expressions "first plurality" and "second plurality" are used in this case differently from the like expressions used before. Each of the beam off units is composed of the first plurality of beam off dots parallel to the line of scan and of the second plurality of beam off dots orthogonally of the line of scan. It is furthermore possible to select a rhomboidal or a certain other shape as each beam on or off unit. In this latter event, the second plurality of beam on and off dots or beam off dots are arranged transversely of the line of scan. On so arranging the beam on and off dots, the central processing unit 38 can be programmed to give a desired outline to the prescribed pattern printed on the sheet of paper 35.

What is claimed is:

1. A laser machining device for machining an object by a laser beam emitted along an optical path and focussed on said object, comprising:
   a table which is movable relative to said optical path and is for carrying said object;
   a movement analyzer for analyzing relative movement between said table and said optical path to produce clock pulses representatives of said relative movement;
   converting means for converting said clock pulses to first and second clock sequences of a first and a second clock period, said second clock period being an integral multiple of said first clock period;
   a first register controlled by said first clock sequence for producing a first data signal representative of beam on and off dots;
   a second register controlled by said second clock sequence for producing a second data signal representative of beam on and off units;
   a logic circuit supplied with said first and said second data signals for producing a combined signal representative of said beam on and off dots only in each beam on unit; and
   an acousto-optic modulator unit placed along said optical path and supplied with said combined signal for directing said laser beam to said object when said combined signal represents the beam on dots.

2. A laser machining device as claimed in claim 1, said relative movement causing said optical path to scan said object along a line of scan, wherein:
   each of said beam on units is composed of a first plurality of beam on and off dots parallel to said line of scan and a second plurality of beam on and off dots transversely of said line of scan, said first plurality being equal to said integral multiple;
   each of said beam off units being composed of said first plurality of beam off dots parallel to said line of scan and said second plurality of beam off dots parallel to the beam on and off dots which are positioned in each of said beam on units transversely of said line of scan, 3. A laser machining device as claimed in claim 2, said laser machining device being for surface treating said object according to a predetermined pattern element, wherein said pattern element is divided into a first predetermined number of beam on and off units along said line of scan and into a second predetermined number of beam on and off units parallel to the beam on and off dots which are positioned in each of said beam on units transversely of said line of scan.

4. A laser machining device as claimed in claim 2, further comprising a beam source unit which comprises a Q switch along said optical path and in which a laser beam source should be placed in a predetermined positional relationship with said Q switch to generate a laser oscillation beam along said optical path, said Q switch being supplied with said first clock sequence to allow said laser oscillation beam to pass therethrough as said laser beam in synchronism with representation by said first data signal of said beam on and off dots in said beam on and off units.

* * * * *

UNITED STATES PATENT AND TRADEMARK OFFICE
CERTIFICATE OF CORRECTION

PATENT NO. : 5,041,716

DATED : August 20, 1991

INVENTOR(S) : Koji Wakabayashi

It is certified that error appears in the above-identified patent and that said Letters Patent is hereby corrected as shown below:

```
Col. 2, line 5, delete "sequences", insert -- sequence --

Col. 2, line 65, delete "drive"' insert -- driver 23 --

Col. 3, line 48, delete "rool"' insert -- roll --

Col. 4, line 63 delete "synchromism"' insert
 -- synchronism --

Col. 6, line 1, delete "illustrate"' insert
-- illustrated --

Col. 6, line 33, delete "Breifly"' insert -- Briefly --

Col. 6, line 47, after "44"' insert -- for --

Col. 7, line 2, delete "galvaonometer", insert
-- galvanometer --
```

UNITED STATES PATENT AND TRADEMARK OFFICE
CERTIFICATE OF CORRECTION

PATENT NO. : 5,041,716
DATED : August 20, 1991
INVENTOR(S) : Koji Wakabayashi It is certified that error appears in the above-identified patent and that said Letters Patent is hereby corrected as shown below:

Col. 7, line 5, delete "2" insert --12 --.

Col. 7, line 20, delete "souce" insert --source --.

Signed and Sealed this

First Day of June, 1993

*Attest:*

MICHAEL K. KIRK

*Attesting Officer*   Acting Commissioner of Patents and Trademarks